April 29, 1952     B. M. McCLAIN     2,594,472
FISHHOOK LEADER CARRIER
Filed July 1, 1950

*Benjamin M. McClain*
Inventor

By *Glenn L. Fish*
Attorney

Patented Apr. 29, 1952

2,594,472

UNITED STATES PATENT OFFICE 2,594,472

FISHHOOK LEADER CARRIER

Benjamin M. McClain, Seattle, Wash.

Application July 1, 1950, Serial No. 171,591

1 Claim. (Cl. 43—57.5)

This invention relates to a fish hook leader carrier and it is one object of the invention to provide a carrier to which leaders separate from or carrying fish hooks may be applied and prevented from becoming tangled when placed in a tackle box.

Another object of the invention is to provide a carrier consisting of a strip so formed that fish hook leaders may be wrapped about it longitudinally thereof and end portions of the leaders wrapped about the carrier transversely thereof and ends of the leaders then secured so that the leaders can not become unwound from the carrier.

Another object of the invention is to so form the leader carrier that a hook may be passed through an opening in an end of the carrier and firmly held against slipping while the leader is being wound about the carrier. The leaders will thus be held taut while being wound upon the carrier and when they are unwound from the carrier they will not have a tendency to curl and hooks carried by the leaders catch about a fish line or other leaders applied to the fish line.

Another object of the invention is to provide the carrier with a retainer so mounted that it may be moved into position to extend across a recess leading from a side edge of the carrier and have gripping engagement with an end portion of a leader wrapped about the carrier and passing through the side recess thereof.

Another object of the invention is to provide a leader carrier which is simple in construction and will occupy a small amount of space when placed in a tackle box.

The invention is illustrated in the accompanying drawings wherein.

Figure 1:
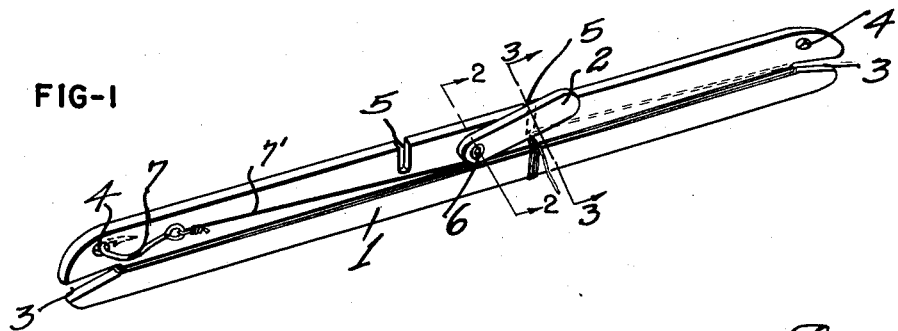
Fig. 1 is a perspective view of the improved leader carrier.
Figure 3:
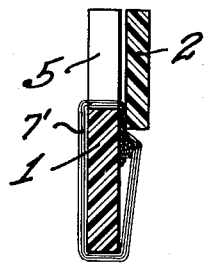
Fig. 3 is a similar view taken along the line 3—3 of Figure 1.
Figure 2:
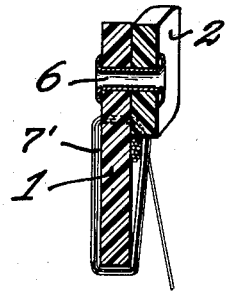
Fig. 2 is a transverse sectional view upon an enlarged scale taken along the line 2—2 of Figure 1.

The improved leader carrier illustrated in Figures 1, 2, and 3 consists of a body 1 and a keeper 2. The body is formed from a flat strip of plastic, or other suitable material, and this elongated body or strip is formed with recesses 3 leading from opposite ends of the body longitudinally thereof and gradually reduced in width so that they taper towards their inner ends. Above each recess 3 is an opening 4, and from an inspection of Figure 1 it will be seen that due to the arrangement of the recesses and the openings each end of the body resembles the head of a fish, the recess representing the mouth and the opening the eye of the fish. Slots or recesses 5 are formed intermediate the length of the body and lead from a side edge thereof, the two transversely extending recesses being spaced from each other longitudinally of the body. The inner end of the keeper 2 is pivotally connected with the body midway the length of the body and as the rivet 6 which pivotally connects the keeper is located between the two transverse recesses or slots 5 the keeper may be swung about its pivot to an operative position in which it extends longitudinally of the body against a side face thereof and across a selected one of the transverse recesses.

When this leader carrier is in use the hook 7 carried by the leader 7' is passed through the opening 4 at one end of the body and the leader is then wrapped about the body longitudinally thereof until the major portion of the leader has been wrapped about the body with portions passing through the recesses 3. The remainder of the leader is then wrapped about the body transversely thereof with portions passing through a selected one of the recesses 5 until the leader has been all wrapped about the body. The leader is then held by pressing its outer end portion against a side face of the body and the keeper is swung downwardly in position to extend longitudinally of the body and across the transverse recess through which the leader is wound. The keeper then has binding engagement with the leader and very effectively prevents the leader from becoming unwound from the carrier. If so desired a second leader may have its hook passed through the opening at the other end of the body and the leader wrapped about the body, first longitudinally of the body and through the end recesses and then transversely of the body and through the second transverse recess. Since the second leader has portions crossing the transversely wound portion of the first leader it will prevent the first leader from becoming loose and unwinding from the carrier and since the keeper will be turned to a position in which it extends across the second transverse recess and the transversely wound portion of the second leader slipping and loosening of the second leader will be prevented.

Figure 4:
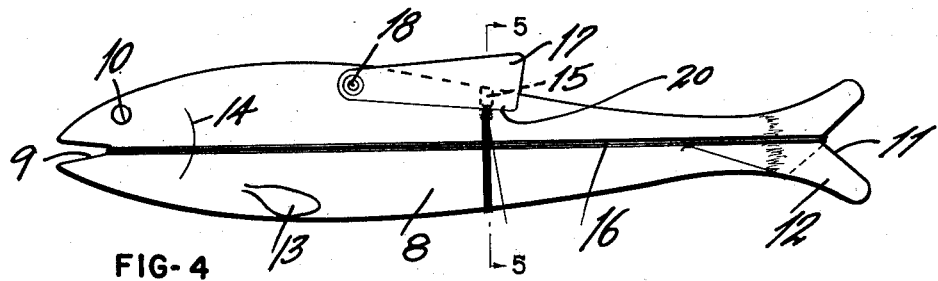
Fig. 4 is a side view of a leader carrier of a modified construction.
Figure 5:
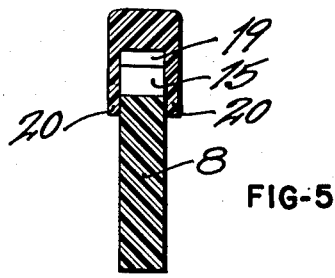
Fig. 5 is a sectional view upon an enlarged scale taken along the line 5—5 of Figure 4.

The leader carrier shown in Figures 4 and 5 has an elongated body which is shaped to represent a side view of a fish. This body has one end portion formed with a recess 9 and an opening 10 representing the mouth and the eye of a fish and the other end of the body is widened and formed with a recess 11 which is wider than the recess 9. Therefore the second end of the body 8 is of such shape that it represents the tail 12 of a fish. Each side face of the body has a fin 13 and a gill 14 marked thereon.

Intermediate its length the body is formed with a transverse slot or recess 15 so that after the leader 16 has been wrapped about the body longitudinally thereof for the major portion of its length the remainder of the leader may be wrapped about the body transversely thereof with portions passing through the transverse recess. The keeper 17 which is pivotally connected with the body by a rivet 18 is then swung downwardly to an operative position in which it extends longitudinally of the body and in crossing relation to the transverse recess and serves to grip and firmly hold the leader against unwinding. This keeper has its under or inner face formed with a longitudinally extending channel 19 and when the keeper is swung to its operative position the keeper is disposed in straddling relation to the body with the body fitting snugly into the channel and side walls 20 defined by the channel disposed in overlapping relation to opposite side faces of the body and in gripping engagement with the transversely wound portion of the leader. In the illustration a leader without a hook has been shown wrapped about the body 8 but it will be understood that a leader carrying a hook could be wrapped about this body with its hook passed through the opening 10.

Having thus described the invention, what is claimed is:

A carrier for a fish hook and leader comprising an elongated strip formed of sheet material and being of appreciably greater width than thickness, said strip having slots leading from opposite ends intermediate its width for reception of portions of a leader when the said leader is wound about the strip longitudinally thereof, each end portion of said strip being formed with a hook-receiving opening located between the slot therein and an adjacent side edge of the strip for reception of a hook at an end of the said leader, and a keeper pivoted at one end against a side face of said strip substantially midway the length thereof for swinging movement longitudinally of the strip to a position in which it extends towards a selected end of the strip, and said strip being formed with transversely extending slots leading from a side edge of the strip and spaced from each other longitudinally of the strip with the pivoted end of the keeper midway between whereby an end portion of the leader may be wrapped about the strip transversely thereof with portions passing through a selected transverse slot and the keeper swung to a position longitudinally of the strip and across the transversely wound end portion of the keeper with the said end portion of the leader gripped between confronting the side faces of the strip and the keeper.

BENJAMIN M. McCLAIN.

REFERENCES CITED

The following references are of record in the file of this patent:

UNITED STATES PATENTS

| Number | Name | Date |
| --- | --- | --- |
| 435,094 | Hewitt | Aug. 26, 1890 |
| 595,998 | Garland | Dec. 21, 1897 |
| 1,371,188 | Wells | Mar. 8, 1921 |
| 2,413,371 | Parker | Dec. 31, 1946 |
| 2,488,160 | Behr | Nov. 15, 1949 |